(12) United States Patent
Müller et al.

(10) Patent No.: US 8,647,699 B2
(45) Date of Patent: Feb. 11, 2014

(54) METHOD FOR COATING SILICONE HYDROGELS

(75) Inventors: Achim Müller, Grossostheim (DE);
Monika Knuth, Aschaffenburg (DE);
Ralf Pasternack, Griesheim (DE); Jens Zotzel, Darmstadt (DE); Christine Reiff, Lörrach (DE)

(73) Assignee: Novartis AG, Basel (CH)

( * ) Notice: Subject to any disclaimer, the term of this patent is extended or adjusted under 35 U.S.C. 154(b) by 7 days.

(21) Appl. No.: 13/403,335

(22) Filed: Feb. 23, 2012

(65) Prior Publication Data

US 2012/0156361 A1 Jun. 21, 2012

Related U.S. Application Data

(62) Division of application No. 12/321,443, filed on Jan. 21, 2009, now Pat. No. 8,142,835.

(30) Foreign Application Priority Data

Jan. 23, 2008 (EP) .................................... 08100829

(51) Int. Cl.
*B05D 3/10* (2006.01)
*B29D 11/00* (2006.01)
*A61K 9/00* (2006.01)

(52) U.S. Cl.
USPC ........... 427/2.1; 427/2.31; 427/301; 427/322; 424/429; 264/1.1; 264/1.32

(58) Field of Classification Search
USPC ............ 424/429; 427/2.1, 322, 299; 264/1.32
See application file for complete search history.

(56) References Cited

U.S. PATENT DOCUMENTS

| 4,326,532 | A | 4/1982 | Hammar .................... 128/349 R |
| 5,409,731 | A | 4/1995 | Nakagawa | |
| 6,896,926 | B2 | 5/2005 | Qiu et al. | |
| 7,790,010 | B2 | 9/2010 | Bentley et al. | |
| 7,968,018 | B2 | 6/2011 | Daulton et al. | |
| 2002/0057417 | A1 | 5/2002 | Galin .............................. 351/166 |
| 2003/0175325 | A1* | 9/2003 | Chatelier et al. ............... 424/429 |
| 2006/0102486 | A1* | 5/2006 | Bentley et al. ................. 205/118 |
| 2007/0138669 | A1* | 6/2007 | Lai et al. ....................... 264/1.32 |
| 2007/0149428 | A1* | 6/2007 | Ammon et al. ................ 510/112 |
| 2008/0258322 | A1* | 10/2008 | Daulton et al. ............... 264/1.32 |

FOREIGN PATENT DOCUMENTS

| EP | 1047542 B1 | 7/2003 |
| EP | 096956 B1 | 11/2004 |
| WO | 9406485 A1 | 3/1994 |
| WO | 9631792 A1 | 10/1996 |
| WO | 9749740 A1 | 12/1997 |
| WO | 0109646 A1 | 2/2001 |
| WO | WO 0109646 A1 * | 2/2001 |
| WO | 0171392 A1 | 9/2001 |
| WO | 03057270 A1 | 7/2003 |

OTHER PUBLICATIONS

PCT International Search Report, Mar. 13, 2009.
PCT Written Opinion of the International Searching Authority, Mar. 13, 2009.

* cited by examiner

*Primary Examiner* — Cachet Sellman
(74) *Attorney, Agent, or Firm* — Sheng-Hsin Hu; Jian Zhou

(57) ABSTRACT

The invention relates to a process for producing biomedical articles, in particular, silicone hydrogel contact lenses having durable hydrophilic chitosan coating. The chitosan coating is covalently attached to the medical device by performing a crosslinking reaction between chitosan and the carboxylic groups on the surface of a medical device directly in a sealed package during autoclave. The coated biomedical articles obtainable by the process of the invention have desirable characteristics regarding adherence to the substrate, durability, hydrophilicity, wettability, biocompatibility and permeability and are thus especially useful in the field of ophthalmic devices.

9 Claims, No Drawings

METHOD FOR COATING SILICONE HYDROGELS

This application is a division of U.S. patent application Ser. No. 12/321,443, filed Jan. 21, 2009 now U.S. Pat. No. 8,142,835, which claims benefit under 35 USC §119 of European patent application No. EP 08100829.4 filed Jan. 23, 2008, the contents of which are incorporated herein by reference in its entirety.

This application claims benefit under 35 USC §119 of European patent application No. EP 08100829.4 filed Jan. 23, 2008, the contents of which are incorporated herein by Reference in its entirety.

The present invention relates to a process for the manufacture of coated articles comprising a silicone hydrogel, such as biomedical articles, especially contact lenses, which are at least partly coated with chitosan.

Chitosan is a polycationic polymer comprising more than 5000 glucosamine units. It may be obtained commercially from shrimp and crabshell chitin by alkaline deacetylation although in commercial samples the degree of the N-deacetylation is almost never complete. Chitosan has found application as an antimicrobial agent against fungi, bacteria, and viruses (for a review, see Rabea, et al., Biomacromolecules 4 (6), 1457-1465, 2003).

Chitosan coatings on medical devices, in particular on contact lenses, have been proposed. For example, WO 94/006485 discloses covalent attachment of chitosan to a contact lens bulk material. Polyionic coatings comprising chitosan are disclosed, for example, in WO 03/057270. U.S. Pat. No. 5,409,731 describes a method for imparting a hydrophilic nature to a water-nonabsorptive contact lens, which comprises dipping a contact lens in an aqueous solution containing a water-soluble amino-group containing polymer and a crosslinking agent.

Silicone hydrogels are preferred bulk materials for the manufacture of contact lenses. A silicone hydrogel refers to a polymeric material obtained from a copolymerization of a polymerizable mixture including at least one silicone-containing monomer, at least one silicone-containing macromer, and/or at least one silicone-containing prepolymer. A silicone hydrogel has a water content of at least 10% by weight when fully hydrated. Silicone hydrogels are well suited for making extended wear contact lenses due to their high oxygen permeability, adequate water content and desirable modulus. However, uncoated silicone hydrogel contact lenses have hydrophobic lens surfaces and are, because of their low wettability, not ophthalmically compatible. Therefore, the surface needs to be coated with a hydrophilic layer. Typical state of the art coatings include: without limitation, surface treatments posterior to polymerization, such as, for example, plasma coating and layer-by-layer coatings, plasma oxidation, or corona treatment; and surface treatments prior to polymerization, such as, rendering the molding surfaces of a mold for making a contact lens hydrophilic, or incorporation of internal wetting agents in a lens formulation for making contact lenses. However, many of these processes are unable to produce durable hydrophilic surface or expensive, or require several extensive handling steps. Because of these reasons, none of the existing processes is ideally suited for integration in a fully automated, high volume manufacturing process with short cycle times, as described, for example in EP-A-969956 or EP-A-1047542.

Contact lenses are often exposed to one or more microorganisms during wear, storage and handling. They can provide surfaces onto which the microorganisms can adhere and then proliferate to form a colony. Microbial adherence to and colonization of contact lenses may enable microorganisms to proliferate and to be retained at the ocular surface for prolonged periods and thereby may cause infection or other deleterious effects on the ocular health of the eye in which the lens is used. Therefore, it is desirous to make various efforts to minimize and/or eliminate the potential for microorganism adhesion to and colonization of contact lenses.

Accordingly, there is a need to provide an efficient process to reduce production cost for the coating of a silicon-containing biomedical article with a hydrophilic component having antimicrobial properties, which is easily integrable in a mass manufacturing process and which provides articles of improved durability and wearer comfort.

In silicone hydrogels, the surface is dominated by the hydrophobic siloxane units, even if the hydrogel is derived from a polymerizable mixture comprising hydrophilic comonomers and/or negatively-charged comonomers. It has been shown that negatively charged comonomers have little or no influence on the deposition of hydrophilic, positively charged chitosan. Surprisingly, it has now been found, that a short incubation in a $C_2$-$C_4$-alcohol enables a non-covalently attached coating of chitosan on the surface of a silicone hydrogel medical device containing carboxylic acid groups.

A further aspect of the invention is that the chitosan coating on the silicone hydrogel medical device is covalently attached through a crosslinking agent, in situ, directly in a medical device package containing a medical device package solution including a crosslinking agent and optional a chitosan. The resultant medical device has a hydrophilicity characterized by an average water contact angle of about 80 degrees or less.

Sterilization of the hydrated medical device during manufacturing and packaging is typically accomplished by autoclaving. The autoclaving process involves heating the packaging of a medical device. As used herein, an "in situ coating process" is intended to describe a process in which a chitosan coating is covalently attached onto a medical device directly in a medical device package which is supplied to a customer. Any medical device packages known to a person skilled in the art can be used in the invention.

The biomedical article of the present invention is, for example an ophthalmic device, preferably a soft contact lens, an intraocular lens or a corneal onlay, or another type of an ophthalmic device used on or about the eye or ocular vicinity. A preferred group of biomedical articles to be coated by the process of the invention are contact lenses, in particular contact lenses for extended wear which are not hydrophilic per se.

The present invention therefore in one aspect concerns a process for coating a biomedical article according to procedure I or II, wherein procedure I comprises the steps of: (a) providing an uncoated contact lens, wherein the article comprises a hydrophobic bulk material made of a silicone hydrogel containing carboxylic acid groups; (b) contacting the contact lens with a $C_2$-$C_4$ alcohol for a predetermined period of time; (c) contacting the contact lens treated in step (b) with a solution comprising chitosan to form a non-covalently attached coating of chitosan on the contact lens; (d) contacting the contact lens with the chitosan coating in a lens package containing a packaging solution comprising a crosslinking agent selected from the group consisting of aliphatic $C_2$-$C_{10}$-dialdehydes, formaldehyde and genipin; and (e) autoclaving said package with the contact lens and the packing solution therein, wherein the chitosan coating the contact lens is covalently attached through the crosslinking agent to the carboxylic acid groups on the lens surface, wherein the resultant contact lens has a hydrophilicity characterized by an average water contact angle of about 80 degrees or less, wherein procedure II comprises the steps of: (i) providing an uncoated contact lens, wherein the article comprises a hydrophobic bulk material made of a silicone hydrogel containing carboxylic acid groups; (ii) contacting the contact lens with a $C_2$-$C_4$ alcohol for a predetermined period of time; (iii) optionally contacting the contact lens treated in step (ii) with a solution comprising chitosan to form a non-covalently attached coating of chitosan on the contact lens; (iv) contacting the contact lens treated in step (ii) or step (ii) and (iii) in a lens package containing a packaging solution comprising chitosan and a crosslinking agent selected from the group consisting of aliphatic $C_2$-$C_{10}$-dialdehydes, formaldehyde and genipin; and (v) autoclaving said package with the contact lens and the packing solution therein thereby forming a covalently attached coating resulting from the reaction of the chitosan with the carboxylic acid groups on the contact lens surface in the presence of the crosslinking agent, wherein the resultant contact lens has a hydrophilicity characterized by an average water contact angle of about 80 degrees or less.

Examples of suitable silicone hydrogels for use in steps (a) and (i) of the present invention are, for example, those currently used for the manufacture of extended wear contact lenses, for example copolymers of (i) one or more hydrophilic monomers, for example selected from the group of hydroxyethylacrylate, hydroxyethylmethacrylate, acrylamide, N,N-dimethyl acrylamide, N-vinylpyrrolidone, N-vinyloxycarbonyl-L-alanine, N-vinyl formamide, N-vinyl acetamide, N-vinyl isopropylamide, N-vinyl-N-methyl acetamide, N-vinyl caprolactam, acrylic or methacrylic acid; and (ii) a monomer and/or macromonomer comprising a siloxane bond or silane group, e.g. trimethylsilyl group. Examples of the latter group are tris-trimethylsilyloxy-silyl-propyl methacrylate (TRIS) or tris-trimethylsilyloxy-silyl-propyl vinyl carbamate (TRIS-VC), a polydimethylsiloxane having a C—C double bond at one single terminal, or a polydimethylsiloxane crosslinker having either a C—C double bonds at both terminals or two or more pendent C—C double bonds, for example, as described in formula (2) below. Examples of suitable commercially available silicone hydrogels are Balafilcon A, Galyfilcon A, Lotrafilcon A, Lotrafilcon B or Senofilcon A.

Another group of preferred silicone hydrogels are amphiphilic segmented copolymers comprising at least one hydrophobic silicon or perfluoroalkyl polyether segment and at least one hydrophilic segment which are linked through a bond or a bridge member. Examples of said silicone hydrogels are disclosed, for example, in PCT applications WO 96/31792 and WO 97/49740 which are herewith incorporated by reference. A particularly preferred amphiphilic segmented copolymer comprises at least one hydrophobic segment selected from the group consisting of a polysiloxane, perfluoroalkyl polyether and a mixed polysiloxane/perfluoroalkyl polyether segment, and at least one hydrophilic segment selected from the group consisting of a polyoxazoline, poly(2-hydroxyethylacrylate), poly(2-hydroxyethylmethacrylate), polyacrylamide, poly(N,N-dimethylacrylamide), polyvinylpyrrolidone and a polyethyleneoxide segment.

Still another group of preferred silicone hydrogels are those obtainable by crosslinking a crosslinkable or polymerizable prepolymer that is obtainable by (a) copolymerizing at least one hydrophilic monomer having one ethylenically unsaturated double bond and at least one silicon crosslinker comprising two or more ethylenically unsaturated double bonds in the presence of a chain transfer agent having a functional group; and (b) reacting one or more functional groups of the resulting copolymer with an organic compound having an ethylenically unsaturated group. Silicon hydrogels of this type are disclosed, for example in WO 01/71392 which is herewith incorporated by reference.

A particularly preferred silicone hydrogel is obtained by crosslinking a prepolymer which is obtainable by (i) copolymerizing a first hydrophilic monomer of the formula

wherein $R_1$ is hydrogen or methyl, and $R_2$ is —COO—$(CH_2)_2$—OH, —CONH$_2$, —CON$(CH_3)_2$, or

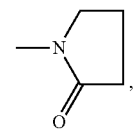

preferably in admixture with one or more further hydrophilic monomers; and a polysiloxane crosslinker that corresponds to formula

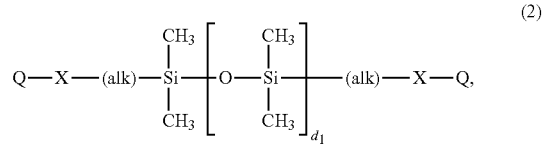

wherein $d_1$ is an integer from 10 to 500, preferably 10 to 300, more preferably 20 to 200 and in particular 25 to 150, (alk) is linear or branched $C_2$-$C_4$ alkylene or a radical —$(CH_2)_{1-3}$—O—$(CH_2)_{1-3}$—, X is —O— or —NH— and Q is a radical of the formula

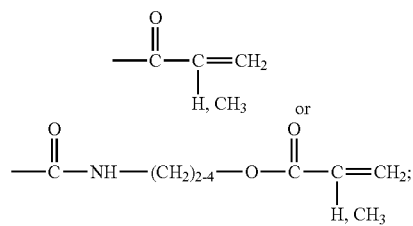

in the presence of a chain transfer agent having a functional group, in particular 2-mercapto-ethanol or especially 2-aminoethane thiol (cysteamine); and (b) reacting the resulting copolymer with an organic compound having an ethylenically unsaturated group, for example with 2-isocyanatoethylmethacrylate (IEM), 2-vinyl-azlactone, 2-vinyl-4, 4-dimethyl-azlactone, acryloyl or methacryloyl chloride, 2-hydroxyethylacrylate (HEA), 2-hydroxymethacrylate (HEMA), glycidylacrylate or glycidylmethacrylat, in particular with IEM or acryloyl chloride.

It is preferred that a silicone hydrogel to be coated by the process of the invention comprises copolymerized acidic groups, in particular copolymerized acrylic acid moieties. A silicone hydrogel comprising copolymerized acryl acid moieties may be obtained if in step (i) above hydroxyethyl acrylate (HEA, first hydrophilic monomer) and acrylic acid (AA; further hydrophilic monomer) are copolymerized.

In accordance with the invention, the packaging solution can be an aqueous solution which is ophthalmically safe. The term "ophthalmically safe" with respect to an aqueous solution for sterilizing and storing contact lenses is meant that a contact lens stored in the solution is safe for direct placement on the eye without rinsing, that is, the solution is safe and sufficiently comfortable for daily contact with the eye via a contact lens. An ophthalmically safe solution has a tonicity and pH that is compatible with the eye and comprises materials, and amounts thereof, that are non-cytotoxic according to international ISO standards and U.S. FDA regulations.

The term "compatible with the eye" means a solution that may be in intimate contact with the eye for an extended period of time without significantly damaging the eye and without significant user discomfort.

An "average contact angle" refers to a water contact angle (measured by Sessile Drop method), which is obtained by averaging measurements of at least three individual contact lenses.

A variety of packages can be used to store contact lenses, including for example, vials, blister packages or equivalents. In particular, so-called blister packages are widely used for the storage and dispensing of the contact lenses. Typically, the blister package for storing and dispensing a contact lens includes an injection-molded or thermoformed plastic base portion incorporating a molded cavity which is surrounded by an outstanding planar flange about the rim of the cavity. The plastic base portion is made of plastic material. A flexible cover sheet is adhered to the surface of the flange so as to seal or enclose the cavity in a generally liquid-tight mode. Within the cavity of the base portion, a contact lens is immersed in a sterile aqueous solution, such as an isotonic saline solution.

In accordance with the present invention, packaging solutions can be prepared in a variety of ways. Preferably, a packaging solution can be formed by dissolving a coating material (e.g., crosslinking agents and optionally chitosan). The concentration of the coating material in a solution can generally vary depending on the particular materials being utilized, the desired coating thickness, and a number of other factors. It may be typical to formulate a relatively dilute aqueous solution of a coating material. For example, a coating material concentration can be between about 0.0001% to about 0.25% by weight, between about 0.005% to about 0.10% by weight, or between about 0.01% to about 0.05% by weight.

In order to alter various characteristics of the coating, such as thickness, the molecular weight of the coating materials can be varied. In particular, as the molecular weight is increased, the coating thickness generally increases.

The packaging solution preferably contains a buffering agent. The buffering agents maintain the pH preferably in the desired range, for example, in a physiologically acceptable range of from about 6.3 to about 7.8, preferably between 6.5 to 7.6, even more preferably between 6.8 to 7.4. Any known, physiologically compatible buffering agents can be used. Suitable buffering agents as a constituent of the packaging solution according to the invention are known to the person skilled in the art. Examples are: boric acid, borates, e.g. sodium borate, citric acid, citrates, e.g. potassium citrate, bicarbonates, e.g. sodium bicarbonate, phosphate buffers (e.g. $Na_2HPO_4$, $NaH_2PO_4$, $Na_2HPO_4$, and $KH_2PO_4$, TRIS (tris(hydroxymethyl)aminomethane), 2-bis(2-hydroxyethyl)amino-2-(hydroxymethyl)-1,3-propanediol, bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino) ethanesulfonic acid), MOPS 3-[N-morpholino]-propanesulfonic acid, PIPES (piperazine-N,N'-bis(2-ethanesulfonic acid), TES (N-[Tris(hydroxymethyl)methyl]-2-aminoethanesulfonic acid), and salts thereof. The amount of each buffer agent is that amount necessary to be effective in achieving a desired pH. Typically, it is present in an amount of from 0.001% to 2%, preferably from 0.01% to 1%; most preferably from about 0.05% to about 0.30% by weight.

The packaging solution is formulated in such a way that they are isotonic with the lachrymal fluid. A solution which is isotonic with the lachrymal fluid is generally understood to be a solution whose concentration corresponds to the concentration of a 0.9% sodium chloride solution.

The isotonicity with the lachrymal fluid, or even another desired tonicity, may be adjusted by adding organic or inorganic substances which affect the tonicity. Suitable occularly acceptable tonicity agents include, but are not limited to sodium chloride, potassium chloride, glycerol, sorbitol, xylitol, mannitol, propylene glycol, polyethylene glycol (PEG) with a molecular weight of about 400 Dalton or less, and mixtures thereof. The tonicity of the solution is typically adjusted to be in the range from about 200 to about 450 milliosmol (mOsm), preferably from about 200 to 450 mOsm, preferably from about 250 to 350 mOsm.

In order to comply with the requirement of short cycle times contacting of the biomedical article with a $C_2$-$C_4$-alcohol according to steps (b and ii) of the present invention is preferably carried out using treating periods of 5 minutes, preferably of ≤1 minute, more preferably of ≤30 seconds. However, longer treating periods may be used without detrimental effects. Suitable C2-C4-alcohols are, for example, ethanol, 1- or 2-propanol, especially ethanol. It is also possible to use a mixture of two or more of the above-mentioned $C_2$-$C_4$-alcohols. Contacting the biomedical article with a $C_2$-$C_4$-alcohol is suitably performed under ambient conditions or at elevated temperature depending on the solvent and on the particular silicone hydrogel used. For example, a temperature of from 10 to 90° C., preferably of from 15° C. to 75° C. is employed. It is particularly preferred to use ethanol at a temperature of from 15° C. to 30° C. over a time period of ≤1 minute or to use 2-propanol at a temperature of from 60° C. to 75° C. over a time period of ≤10 minutes, especially over 1 minute.

The chitosan solution of steps (c and iii) of the invention preferably is an aqueous solution having a pH value in the range of 5.5 to 6.5, especially of from 5.8 to 6.3. Chitosans of diverse degrees of deacetylation and purities may be used.

As a crosslinking agent in steps (d and iv) of the invention may serve a natural crosslinking agent such as genipin or a multialdehyde having two or more aldehyde groups or formaldehyde. Preferred multialdehydes are dialdehydes, in particular aliphatic $C_2$-$C_{10}$-dialdehydes. Particularly preferred $C_2$-$C_{10}$-dialdehydes are, for example, glyoxal, malondialdehyde and glutardialdehyde. Particularly preferred crosslinking agents are glutardialdehyde, formaldehyde and genipin. Most preferably the crosslinking agent is glutardialdehyde or formaldehyde.

Genipin is an iridoid glycoside present in fruits (Gardenia jasmindides Ellis). It may be obtained from the parent compound geniposide, which may be isolated from natural sources as described elsewhere. Genipin, the aglycone of geniposide, may be prepared from the latter by oxidation followed by reduction and hydrolysis or by enzymatic hydrolysis. Alternatively, racemic genipin may be prepared synthetically. Natural configuration of genipin, any stereoisomer or mixture of stereoisomers of genipin may be used as a crosslinking reagent, in accordance with the present invention.

"Contacting" in steps (b) to (d) in the procedure I or (ii) to (iii) in the procedure II of the invention may be accomplished according to processes known per se. For example, the biomedical article is immersed in the treatment solution, or the treatment solution is deposited on the biomedical article surface, for example, by dipping, spraying, printing, spreading, pouring, rolling or spin coating, spraying or particularly dipping being preferred. The treatment solution can be a packaging solution for the biomedical article.

The autoclaving process of step (e) in the procedure I or (v) in the procedure II of the process of the invention is preferably being carried out at a temperature of ≥100° C. for a time period of about 15 minutes to about 5 hours. It is particularly preferred to achieve cross-linking by autoclaving at 110 to 130° C. for about 15 min to about 3 h.

Thus, in one embodiment, the invention relates to a process for coating a medical article according to procedure I or II, wherein procedure I comprises the steps of: (a) providing an uncoated medical article, wherein the article comprises a hydrophobic bulk material made of a silicone hydrogel containing carboxylic acid groups; (b) contacting the medical article with a $C_2$-$C_4$ alcohol selected from the group consisting of ethanol, 1-propanol and 2-propanol at a temperature of from 15° C. to 75° C. for a time period of ≤5 minutes; (c) contacting the medical article treated in step (b) with a solution comprising chitosan having a pH value in the range of 5.8-6.3 to form a non-covalently attached coating of chitosan on the medical article; (d) contacting the medical article with the chitosan coating in a lens package containing a packaging solution comprising a crosslinking agent selected from the group consisting of glutardialdehyde, formaldehyde and genipin; and (e) autoclaving said package with the medical article and the packing solution therein, wherein the chitosan coating the medical article is covalently attached through the crosslinking agent to the carboxylic acid groups on the medical article surface, wherein the resultant medical article has a hydrophilicity characterized by an average water contact angle of about 80 degrees or less, wherein procedure II comprises the steps of: (i) providing an uncoated medical article, wherein the article comprises a hydrophobic bulk material made of a silicone hydrogel containing carboxylic acid groups; (ii) contacting the medical article with a $C_2$-$C_4$ alcohol selected from the group consisting of ethanol, 1-propanol and 2-propanol at a temperature of from 15° C. to 75° C. for a time period of ≤5 minutes; (iii) optionally contacting the medical article treated in step (ii) with a solution comprising chitosan having a pH value in the range of 5.8-6.3 to form a non-covalently attached coating of chitosan on the medical article; (iv) contacting the contact lens treated in step (ii) or step (ii) and (iii) in a lens package containing a packaging solution comprising chitosan and a crosslinking agent selected from the group consisting of glutardialdehyde, formaldehyde and genipin; and (v) autoclaving said package with the medical article and the packing solution therein thereby forming a covalently attached coating resulting from the reaction of the chitosan with the carboxylic acid groups on the medical article surface in the presence of the crosslinking agent, wherein the resultant medical article has a hydrophilicity characterized by an average water contact angle of about 80 degrees or less.

According to the process of the invention, biomedical articles, in particular ophthalmic articles, are obtained that have a variety of unexpected advantages over those of the prior art, which make those articles very suitable for practical purposes, e.g. as contact lens for extended wear. For example, they do have a high surface wettability and lubricity. This can be demonstrated, for example, by the finger tip test showing a very slippery article surface; or by visual inspection; or by suitable contact angle measurements. For example, sessile drop static contact angles of coated and non-coated lenses are determined with a DSA 10 drop shape analysis system from Krüss (Krüss GmbH, Hamburg, Germany). While uncoated silicon hydrogel contact lenses in general have a water contact angle of 90 to 100° or above, a treatment according to the process of the invention significantly reduces said value. A further tool for assessing the superior quality of the surface coatings obtainable according to the process of the invention is the Sudan Black dye absorption test as described below in the Examples section.

It is particularly surprising that the surface treatment according to the present invention in general does not affect the properties of the underlying organic bulk material. While prior art coating processes often affect article properties such as transparency, ion permeability, oxygen transmissibility, water contents or device geometry (e.g. diameter of a contact lens), said parameters are not or at least not significantly affected by the process of the invention.

The previous disclosure will enable one having ordinary skill in the art to practice the invention. In order to better enable the reader to understand specific embodiments and the advantages thereof, reference to the following examples is suggested.

EXAMPLES

Example 1

Preparation of a Soft Silicon Hydrogel Contact Lens Comprising Copolymerized Acrylc Acid Moieties in the Lens Bulk Material (a) Preparation of PDMS Crosslinker I In a 4-L beaker, 24.13 g of $Na_2CO_3$, 80 g of NaCl and 1.52 kg of deionized water are mixed to dissolve. In a separate 4-L beaker, 700 g of bis-3-aminopropyl-polydimethylsiloxane (Shin-Etsu, MW ca. 11500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 14.5 g of acryloyl chloride are dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 µm exclusion, and concentrated on a rotary evaporator. The resulting oil is further purified by high-vacuum drying to constant weight. Analysis of the resulting product by titration reveals 0.175 mEq/g of C=C double bonds.

(b) Preparation of PDMS Crosslinker II

In a 4-L beaker, 61.73 g of $Na_2CO_3$, 80 g of NaCl and 1.52 kg of deionized water are mixed to dissolve. In a separate 4-L beaker, 700 g of bis-3-aminopropyl-polydimethylsiloaxane (Shin-Etsu, MW ca. 4500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 36.6 g of acryloyl chloride is dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 μm exclusion, and concentrated on a rotary evaporator. The resulting oil is further purified by high-vacuum drying to constant weight. Analysis of the resulting product by titration reveals 0.435 mEq/g of C=C double bonds.

(c) Preparation of the Crosslinkable Copolymer

A 2-L jacketed reactor is equipped with a heating/chilling loop, septum inlet adapter, reflux condenser with $N_2$-inlet adapter, and overhead stirring. A solution is generated by dissolving 48.76 g of PDMS crosslinker I produced by the procedure described in section (a) and 17.71 g of PDMS crosslinker II produced by the procedure described in section (b) in 150 g of 1-propanol. This solution is charged to the reactor and cooled to 8° C. The solution is degassed by evacuating to less than 5 mBar, holding at vacuum for 15 minutes, and then re-pressurizing with dry nitrogen. This degas procedure is repeated for a total of 5 times. In a separate 500 mL flask equipped with magnetic stirring and a vacuum-inlet adapter with valve, 1.93 g of cysteamine hydrochloride is dissolved in 300 mL of 1-propanol. In another 500 mL flask equipped with magnetic stirring and vacuum-inlet adapter with valve, a solution of 36.63 g of hydroxyethyl acrylate (HEA) and 2.14 g of acrylic acid (AA) are dissolved in 300 mL of 1-propanol. In a third flask, similarly equipped, 0.35 g of AIBN is dissolved in 150 g of 1-propanol. All three solutions are degassed twice by evacuation to 60 mBar, holding vacuum for 5 minutes, and then re-pressurizing with nitrogen.

Under a positive flow of nitrogen, the reactor is opened and the cysteamine hydrochloride, HEA/AA, and AIBN solutions are charged to the reactor. Still holding at 8° C., the reactor is degassed by evacuating to less than 5 mBar and holding for 5 minutes, then re-pressurizing with nitrogen. A total of four degassing cycles are performed. The reactor is then heated to 68° C. and held at this temperature under nitrogen with stirring for 16 hours. The reaction mixture is then transferred to a flask and vacuum stripped at 40° C./100 mBar on a rotary evaporator to remove 1-propanol. After the first 500 g of 1-propanol are removed, 500 g of water are added slowly with stirring to create an emulsion. The emulsion is then further stripped of 1-propanol until 200 g of distillate are collected. 200 g of water are again added back to the emulsion, and solvent-exchange is continued to collect a final 200 g of distillate. The resulting emulsion is then diluted to 2.0 kg.

This emulsion is then charged to a 2-L reactor equipped with overhead stirring, refrigeration loop, thermometer, and the pH meter and dispensing tip of a Metrohm Model 718 STAT Titrino. The reaction mixture is then cooled to 1° C. 1.5 g of $NaHCO_3$ are charged to the emulsion and stirred to dissolve. The Titrino is set to maintain pH at 9.5 by intermittent addition of 15% sodium hydroxide solution. 6.2 mL of acryloyl chloride are then added over one hour using a syringe pump. The emulsion is stirred for another hour, then the Titrino is set to neutralize the reaction mixture by addition of a 15% solution of hydrochloric acid. The emulsion is then drained from the reactor, diluted to 3.5 L and filtered to 16 μm exclusion. The emulsion is purified by diafiltration (nominal molecular weight cut-off, 10,000 D) with deionized water until the permeate conductance is below 2.5 μS/cm, and the polymer is isolated by lyophilization.

(d) Preparation of Contact Lenses 15.73 g of the polymer from step A. are dissolved in approximately 320 mL of 1-propanol, then dried with 1.5 g of magnesium sulfate and filtered to 17 μm exclusion using a fritted glass filter. 312.25 g of solution at 4.61% solids are recovered. 3.61 g of a 1% solution of 2-hydroxy-4'-hydroxyethyl-2-methylpropiophenone (IRGACURE®-2959, Ciba Specialty Chemicals) are added, and then the solution is concentrated to a final weight of 20.57 g (70% solids).

The above formulation is used to cast lenses as follows. 200 mg of the formulation are dosed into poly(propylene) molds and the molds are closed. The molds are then irradiated for 18 s with an ultraviolet light source having an intensity of 2.01 $mW/cm^2$.

The molds are then opened, and the mold halves which have a lens attached are soaked in a mixture of 80% isopropanol, 20% water (v/v) overnight. The lenses are rinsed off the molds with this solvent mixture, then rinsed twice for 2 hrs. each in fresh aliquots of isopropanol/water mixture. The lenses are drained and then hydrated by immersion in deionized water. They are then rinsed three times for 2 h in pure water (3.0 mL/lens).

Example 2

Preparation of a Soft Silicone Hydrogel Contact Lens being Devoid of Copolymerized Carboxylic Acid Moieties in the Lens Bulk Material (a) Preparation of the Crosslinkable Copolymer A 2-L jacketed reactor is equipped with a heating/chilling loop, reflux condenser, $N_2$-inlet/vacuum adapter, feeding tube adapter and overhead mechanical stirring. A solution is generated by dissolving 90.00 g of PDMS crosslinker I prepared according to example 1(a) and 30.00 g of PDMS crosslinker II prepared according to example 1(b) in 480 g of 1-propanol. This solution is charged to the reactor and cooled to 8° C. The solution is degassed by evacuating to less than 15 mBar, holding at vacuum for 15 minutes, and then re-pressurizing with dry nitrogen. This degas procedure is repeated for a total of 3 times. The reactor is held under a blanket of dry nitrogen.

In a separate flask, a monomer solution is prepared by mixing 1.50 g of cysteamine hydrochloride, 0.3 g of AIBN, 55.275 g of DMA, 18.43 g of HEA and 364.5 g of 1-propanol. This solution is filtered with a Waterman 540 filter paper, and then added to the reactor through a degas unit and HPLC pump with a flow rate of 3.0 mL/minute. The reaction temperature is then elevated to 68° C. with a heating ramp about one hour.

In a second flask, a feeding solution is prepared by mixing 4.5 g of cysteamine hydrochloride and 395.5 g of 1-propanol and then filtering with Waterman 540 filter paper. When the reactor temperature reaches 68° C., this solution is slowly dosed into the reactor through the degasser/HPLC pump over 3 hours. The reaction is then continued at 68° C. for an additional 3 hours, on which heating has discontinued and the reactor is allowed to cool to room temperature.

The reaction mixture is transferred to a flask and stripped solvent at 40° C. under vacuum on a rotary evaporator until 1000 g of sample remained. The solution is then slowly mixed with 2000 g of deionized water with rapid agitation. Additional solvent is further removed until about 2000 g of sample remain. During this stripping process, the solution gradually becomes an emulsion. The resulting material is purified by ultrafiltration over a 10 kD molecular weight cut-off membrane until the permeate conductance is below 2.5 µS/cm.

This emulsion is then charged to a 2-L reactor equipped with overhead stirring, refrigeration loop, thermometer, and the pH meter and dispensing tip of a Metrohm Model 718 STAT Titrino. The reaction mixture is then cooled to 1° C. 7.99 g of $NaHCO_3$ are charged to the emulsion and stirred to dissolve. The Titrino is set to maintain pH at 9.5 by intermittent addition of 15% sodium hydroxide solution. 11.59 mL of acryloyl chloride are then added over one hour using a syringe pump. The emulsion is stirred for another hour, then the Titrino is set to neutralize the reaction mixture by addition of a 15% solution of hydrochloric acid. The product is purified by ultrafiltration again with 10 kD molecular weight cut-off membrane until the permeate conductance is below 2.5 µS/cm. The final macromonomer is isolated by lyophilization.

(b) Preparation of Contact Lenses 18.83 g of the polymer obtained according to step (a) are dissolved in approximately 200 mL of 1-propanol, concentrated to ca. 70 g total solution weight, and filtered to 0.45 µm exclusion. 67.94 g of solution at 26.53% solids are recovered. 4.503 g of a 1% solution of 2-hydroxy-4'-hydroxyethyl-2-methylpropiophenone (IRGACURE®-2959, Ciba Specialty Chemicals) are added, and the solution is then concentrated to a final formulation having 60% solids.

200 mg of the formulation are dosed into poly(propylene) contact lens molds and the molds are closed. The molds are then irradiated for 15 s with an ultraviolet light source having an intensity of 2.18 mW/cm². The molds are then opened, and the contact lenses are removed from the mold halves.

Example 3

Preparation of a Soft Silicone Hydrogel Contact Lens having Attached to its Surface a Crosslinked Chitosan Coating Silicone hydrogel contact lenses comprising copolymerized acrylic acid in the lens bulk material prepared according to Example 1(d) are immersed in isopropanol for 10 min at 75° C. and then directly transferred to an aqueous 0.04% solution of 85% deacetylated chitosan from crab shell (Sigma-Aldrich) at pH 6.3. Directly 100 µl of a 5.8% glutardialdehyde solution is added and the lenses are autoclaved for 30 min at 121° C., 1 bar. The coated lens is investigated by visual wettability and hydrophilicity testing (with and without rubbing of the surface) as well as contact angle measurements and Sudan Black staining test. The results are summarized in example 7, Table I.

Example 4 (Comparison)

Coating Procedure Without Pretreatment in Isopropanol

The coating procedure according to Example 3 is repeated, except that the immersion step in isopropanol is omitted. The results are summarized in example 7, Table I.

Example 5

Preparation of a Soft Silicone Hydrogel Contact Lens having Attached to its Surface a Crosslinked Chitosan Coating Silicone hydrogel contact lenses without any ionic groups in the bulk material prepared by the method of example 2 are incubated in ethanol for 1 min at room temperature and then directly transferred into a 0.04% solution of 85% deacetylated chitosan (Hydagen HCMF, Fa. Cognis) at pH 6. Directly 100 µl of a 2% formaldehyde solution in phosphate buffered saline is added and the lenses are autoclaved for 30 min at 121° C., 1 bar. The results are summarized in example 7, Table I.

Example 6

Preparation of a Soft Silicone Hydrogel Contact Lens having Attached to its Surface a Crosslinked Chitosan Coating Silicone hydrogel contact lenses without any ionic groups in the bulk material prepared by the method of example 2 are incubated in ethanol for 1 min at room temperature and then directly transferred into a 0.04% solution of 85% deacetylated chitosan (Hydagen HCMF, Fa. Cognis) at pH 6. Directly 100 µl of a 5.6% glutardialdehyde solution in phosphate buffered saline is added and the lenses are autoclaved for 30 min at 121° C., 1 bar. The results are summarized in example 7, Table I.

Example 7

Surface Characterization (i) Wettability

Qualitative assessment by visual inspection of the contact lens. The ranking is based on the observation, how fast a film of the storage solution on the surface of the autoclaved contact lens vanishes following the removal of the lens from the storage vial with tweezers.
0=no wetting, i.e. no film on the surface, droplets at most
1=slight or partial wetting; a film is present but tears more or less immediately (<5 sec)
2 =good wetting; a film on the surface is present and is rather stable (film tearing >5 s)

(ii) Lubricity

Qualitative evaluation by contacting the lens surface with the finger tips.
0=tacky or frictional surface
1=indifferent surface with respect to tackiness/lubricity
2=slippery surface (iii) Water Contact Angle The measurement is performed by the sessile drop method with a DSA 10 drop shape analysis system from Krüss GmbH, Germany with pure water (Fluka, surface tension 72.5 mN/M at 20° C.). For measurement purposes a contact lens is taken off the storage solution with tweezers and excess storage solution is removed by gentle shaking. The contact lens is placed on the male part of a contact lens mold and gently blotted with a dry and clean cloth. A water droplet (about 1 µl) is then dosed on the lens apex, and the change of the contact angle over time of this water droplet (WCA(t), circle fitting mode) is monitored; WCA is calculated by extrapolation of the graph WCA(t) to t=0.

(iv) Sudan Black Dye Absorption Test

A 0.5% (w/w) Sudan Black dye solution is prepared by dissolving 0.5 g of Sudan Black B (Aldrich) over night in 100 g of vitamin E oil under stirring. For measurement purposes, the surface-treated lens is first of all autoclaved (30 min, 121° C.) in 2 ml of a phosphate buffered saline (pH 7.2) in a glass vial. The contact lens is then removed from the solution with tweezers and gently shaken so that most of the surface water is removed. The lens is then placed in the above prepared Sudan Black dye solution for 5 min. Thereafter the lens is removed from the dye-bath, and the excess dye solution is rinsed off with warm water. The lens is air-dried and assessed according to its degree of staining.

2=no or almost no staining
1=slight staining
0=considerable staining

The values obtained with contact lenses as coated in Examples 2-6 and with the corresponding uncoated contact lenses (control) are summarized in Table I below

TABLE I

| Example | Wetta-bility | Lubric-ity | WCA [°] | WCA [°] (before rubbing) | WCA [°] (after rubbing) | Sudan Black |
|---------|--------------|------------|---------|--------------------------|-------------------------|-------------|
| 3 | 2 | 2 | — | 32 | 44 | 2 |
| 3(Control) | 0 | 0 | 107 | — | — | 0 |
| 4 | — | — | — | 100 | 102 | 0 |
| 4(Control) | 0 | 0 | 107 | — | — | 0 |
| 5 | 2 | 2 | — | 17 | 42 | 2 |
| 5(Control) | 0 | 0 | 109 | — | — | 0 |
| 6 | 2 | 2 | — | 27 | 33 | 2 |
| 6(Control) | 0 | 0 | 109 | — | — | 0 |

The invention claimed is:

1. A process for coating a medical article comprises the steps of:
   (a) providing an uncoated medical article, wherein the article comprises a hydrophobic bulk material made of a silicone hydrogel containing carboxylic acid groups;
   (b) contacting the medical article with a $C_2$-$C_4$ alcohol for a treating period of ≤5 minutes;
   (c) contacting the medical article treated in step (b) in a lens package containing a packaging solution comprising chitosan and a crosslinking agent selected from the group consisting of aliphatic $C_2$-$C_{10}$-dialdehydes, formaldehyde and genipin; and
   (d) autoclaving said package with the medical article and the packaging solution therein thereby forming a covalently attached coating resulting from the reaction of the chitosan with the carboxylic acid groups on the medical article surface in the presence of the crosslinking agent, wherein the resultant medical article has a hydrophilicity characterized by an average water contact angle of about 80 degrees or less.

2. A process claim 1, wherein the step (b) is performed at a temperature of from 15° C. to 75° C., wherein the $C_2$-$C_4$ alcohol is selected from the group consisting of ethanol, 1-propanol and 2-propanol, wherein the chitosan solution has a pH value in the range of 5.8-6.3, wherein the crosslinking agent is selected from the group consisting of glutardialdehyde, formaldehyde and genipin.

3. A process according to claim 2, wherein the medical article is a silicone hydrogel contact lens.

4. A process according to claim 3, wherein the silicone hydrogel contact lens comprises copolymerized acrylic acid moieties.

5. A process according to claim 4, wherein the crosslinking agent is glutardialdhyde.

6. A process according to claim 5, wherein during step (b) the medical article is contacted with 2-propanol at a temperature of from 60° C. to 75° C. over a time period of ≤1 minute.

7. A process according to claim 2, wherein the crosslinking agent is formaldehyde.

8. A process according to claim 7, wherein the article is contacted with ethanol at a temperature of from 15° C. to 30° C. over a time period of ≤1 minute.

9. A process according to claim 2, wherein the crosslinking agent is genipin.

* * * * *